Patented Oct. 23, 1951

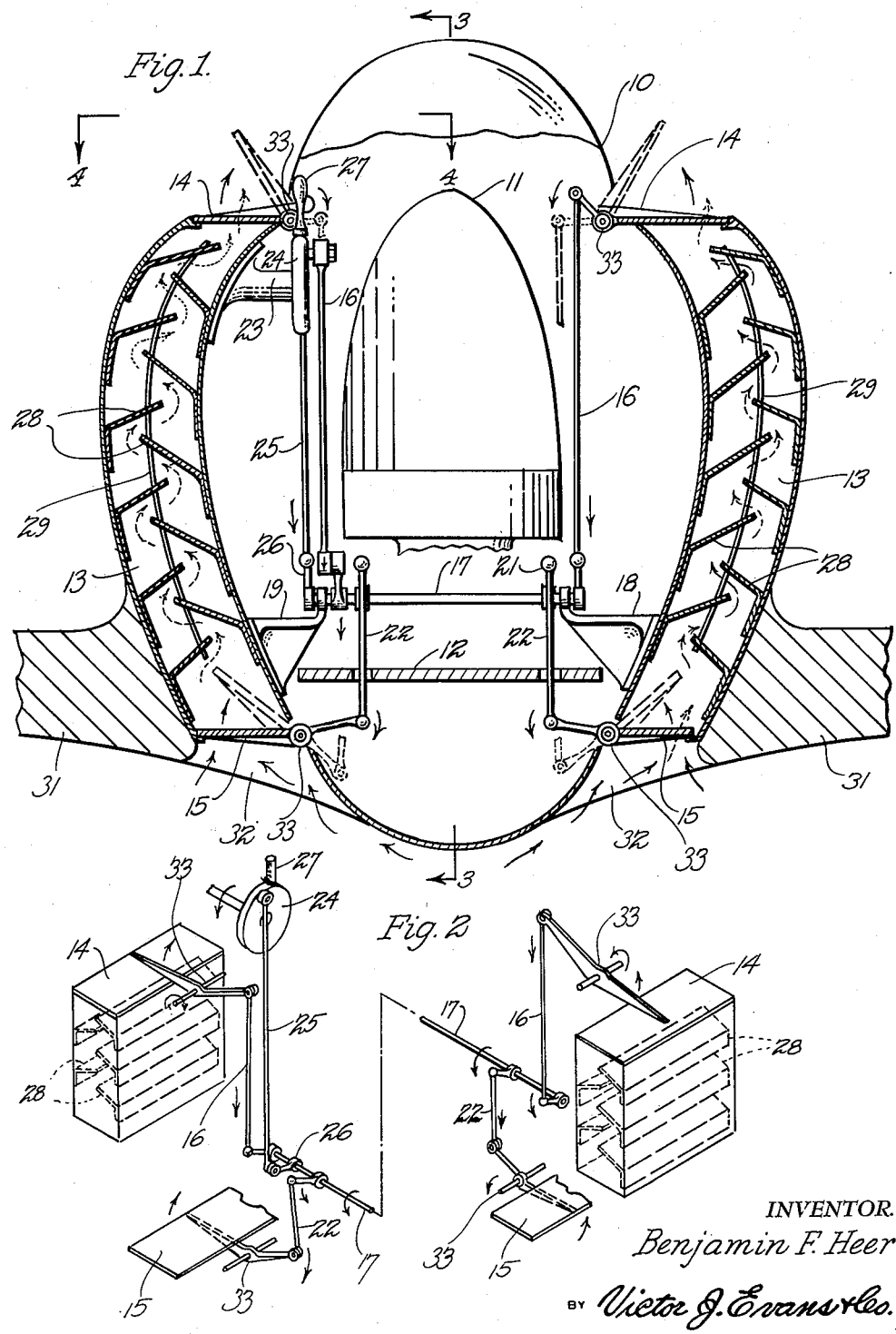

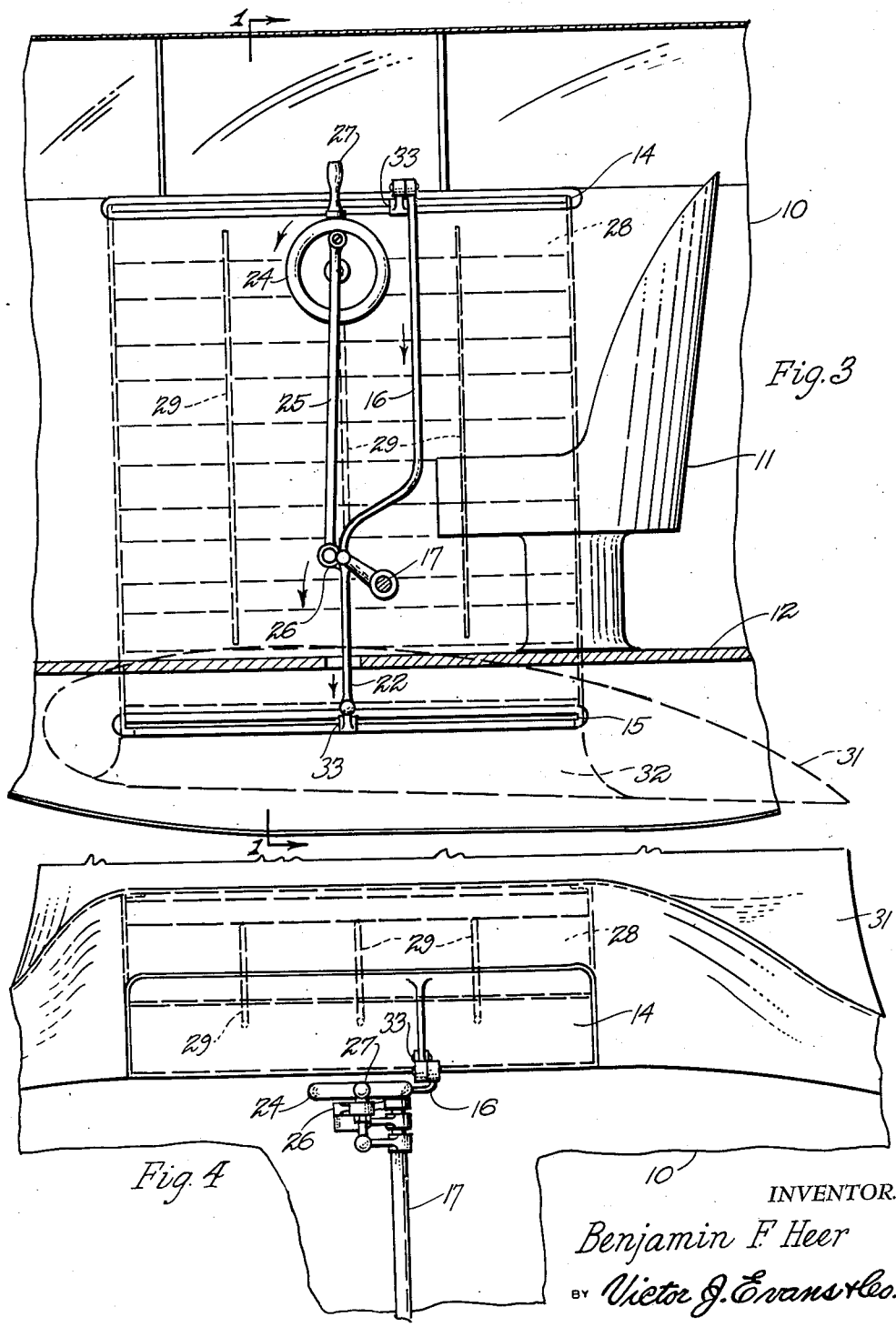

2,572,147

UNITED STATES PATENT OFFICE 2,572,147

AIRCRAFT WITH ADJUSTABLE GLIDE CONTROL CHANNELS

Benjamin F. Heer, La Crosse, Wis.

Application September 26, 1947, Serial No. 776,385

1 Claim. (Cl. 244—139)

This invention relates to an air resistance device for controlling the descent of airplanes.

It is an object of the present invention to provide an air resistance device for airplanes which will permit the same to descend easily upon failure of a motor in a controlled glide wherein this descent is controlled by closure devices disposed at opposite ends of the air passages, the control being operated through linkage and control handles accessible to the operator of the airplane which is being descended.

Other objects of the present invention are to provide an air resistance device for airplanes and the like which can be conveniently and easily incorporated in the airplane or the like, which is of simple construction, inexpensive to manufacture and efficient in operation.

For a better understanding of the invention, reference may be had to the following detailed description taken in connection with the accompanying drawing, in which:

Fig. 1 is a transverse cross-sectional view of an airplane or like showing the air resistance passages and the control mechanism for closing and opening closure plates at opposite ends of the air resistance passages, Figure 2 is an illustrated view of the control mechanism for the closure plates, Fig. 3 is a longitudinal cross-sectional view taken through the airplane or the like and along lines 3—3 of Fig. 1, the Fig. 1 having been taken on the line 1—1 of Fig. 3, Fig. 4 is a cross-sectional view taken on line 4—4 of Fig. 1.

Referring now to the figures, 10 represents a cabin of an airplane or the like in which is located a seat 11 and the floor board 12. Externally of the cabin and positioned in outwardly bulging arcuate sections of the side walls and at opposite sides thereof there are respectively disposed air resistance passages 13 open at the top and bottom and adapted to be closed to prohibit the passage of air therethrough by closure plates 14 and 15 which are connected together by a linkage arrangement indicated generally at 16 whereby the plates may be operated in unison to present the air to the passages 13 and permit the outlet of the air from these passages.

The linkage mechanism comprises a shaft 17 journalled between brackets 18 and 19 extending inwardly from opposite sides of the cabin wall. This shaft has a plurality of arms or levers 21 which are connected respectively by links 22 with the respective closure plates 14 and 15. At the top of the cabin wall and at one side thereof is a bracket 23 which has a wheel 24 journalled thereon. This wheel 24 is connected through a link 25 with an arm 26 on the shaft 17. The wheel 24 is located near the seat 11 and can be operated by a handle 27.

As passage 13 has staggered and inclined baffle plates 28 with which the air engages to cause the air to take a circuitous path on passing through the passages, one baffle extends inwardly from one side wall of the baffle while the next baffle passes inwardly from the opposite wall of the air passage. The baffles can be tied together and supported by curved rods 29 extending through the passages to lock the baffles together. The baffles 28 are either inclined inwardly and upwardly as shown in Fig. 1 or inclined inwardly and downwardly.

Should the airplane have to descend without power from its motor the control of the descent can be had by the linkage 16 connected with the closure plates 15. Both wing portions 31 extend outwardly from the passage walls and have a mouth inlet 32 therein to receive the incoming air.

It will be apparent that there has been provided a simple airplane arrangement for controlling the descent of the same. Each closure plate is pivoted in openings in the cabin wall as indicated at 33, the plate 15 will pivot upwardly and into the air passage to a position indicated by the dotted lines. The closure plate 14, however moves upwardly and away from the outlet end of the air passage.

With these comparatively open vertically disposed passages extended through the fuselage of an airplane means is provided which when the motor fails and the plane goes into a glide makes it possible to vary the angle of the glide and thereby bring the ship down with safety.

The lower ends of the vertically disposed air resistant passages or tunnels 13 extend through the wings 31 of the airship and the upper ends extend to points spaced from the upper surface of the fuselage. The outer surface of the fuselage is streamlined to facilitate the passage of air over these bulging sections and to prevent cavities forming at the rear of the sections. These vertically disposed passages or tunnels are normally closed and are only used in an emergency to vary the lift or facilitate the descent of the airship.

While various changes may be made in the detail construction it shall be understood that such changes shall be within the spirit and scope of the present invention as defined by the appended claim.

I claim:

In an airplane, the combination which comprises a fuselage having arcuate outwardly bulging side walls, wings extended laterally from the fuselage, said wings having vertically disposed openings extended therethrough and positioned against the side walls of the fuselage, arcuate vertically disposed channels mounted against the outer surfaces of the side walls of the fuselage and positioned with the lower ends thereof extended into the said openings through the wings, staggered upwardly inclined baffles extended inwardly from opposite sides of the said channels for retarding upward passage of air therethrough, closure plates pivotally mounted on the upper and lower ends of the said channels, a hand lever positioned in the fuselage, and means operatively connecting the said hand lever to the closure plates.

BENJAMIN F. HEER.

REFERENCES CITED

The following references are of record in the file of this patent:

UNITED STATES PATENTS

| Number | Name | Date |
|---|---|---|
| 1,449,099 | Hall | Mar. 20, 1923 |
| 1,693,518 | Kessler | Nov. 27, 1928 |
| 1,773,625 | Kunicke | Aug. 19, 1930 |
| 1,922,167 | Leray | Aug. 15, 1933 |
| 1,959,270 | Hedlof | May 15, 1934 |
| 2,382,016 | Love | Aug. 14, 1945 |

FOREIGN PATENTS

| Number | Country | Date |
|---|---|---|
| 139,376 | Great Britain | Mar. 4, 1920 |